(12) United States Patent
Kume et al.

(10) Patent No.: US 12,715,479 B2
(45) Date of Patent: Aug. 25, 2026

(54) DRIVING ASSISTANCE DEVICE AND DRIVING ASSISTANCE METHOD

(71) Applicant: Hitachi Astemo, Ltd., Hitachinaka (JP)

(72) Inventors: Hideyuki Kume, Hitachinaka (JP); Morihiko Sakano, Tokyo (JP); Shigenori Hayase, Hitachinaka (JP); Tatsuhiko Monji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 94 days.

(21) Appl. No.: 18/713,760

(22) PCT Filed: Dec. 1, 2021

(86) PCT No.: PCT/JP2021/044095
§ 371 (c)(1),
(2) Date: May 28, 2024

(87) PCT Pub. No.: WO2023/100287
PCT Pub. Date: Jun. 8, 2023

(65) Prior Publication Data

US 2024/0400112 A1 Dec. 5, 2024

(51) Int. Cl.
*B60W 60/00* (2020.01)
*B60W 50/14* (2020.01)
*G01C 21/00* (2006.01)

(52) U.S. Cl.
CPC .......... *B60W 60/005* (2020.02); *B60W 50/14* (2013.01); *G01C 21/3804* (2020.08); *B60W 2510/20* (2013.01); *B60W 2556/40* (2020.02)

(58) Field of Classification Search
None
See application file for complete search history.

(56) References Cited

U.S. PATENT DOCUMENTS 12,063,386 B2 * 8/2024 Cao .................... H04N 19/172
12,311,971 B2 * 5/2025 Jiralerspong ..... B60W 50/0097
12,392,635 B2 * 8/2025 Kume .................. G01C 21/30
(Continued)

FOREIGN PATENT DOCUMENTS

JP 2021-006431 A 1/2021

OTHER PUBLICATIONS

International Search Report issued in PCT Application No. PCT/JP2021/044095 dated Mar. 1, 2022, with English Translation.

*Primary Examiner* — Hunter B Lonsberry
*Assistant Examiner* — Robert L Pinkerton
(74) *Attorney, Agent, or Firm* — Foley & Lardner LLP

(57) ABSTRACT

A driving assistance device can be configured to set a determination point in which an assumed self-position of own vehicle that is assumed on a map, a position of a measurement target feature on the map, and an error predicted as a difference between the position on the map and an actual position of the measurement target feature are associated with each other. The measurement target feature is measurable from the assumed self-position to obtain a measurement position of the measurement target feature based on external information acquired by an external sensor mounted on the own vehicle. The driving assistance device can determine a self-position of the own vehicle on the map based on the external information. The driving assistance device can set a control mode of a driving assistance system of the own vehicle based on the determination point.

14 Claims, 7 Drawing Sheets

(56) References Cited

U.S. PATENT DOCUMENTS

| | | | | |
|---|---|---|---|---|
| 2005/0057374 | A1* | 3/2005 | Tanaka | B62D 15/0285 340/932.2 |
| 2019/0384319 | A1* | 12/2019 | Sakagami | G01C 21/3602 |
| 2020/0341470 | A1* | 10/2020 | Maeda | G01C 21/3822 |
| 2021/0080264 | A1* | 3/2021 | Sugiura | G01C 21/30 |
| 2021/0188275 | A1* | 6/2021 | Matsumura | B60W 60/0053 |

* cited by examiner

DRIVING ASSISTANCE DEVICE AND DRIVING ASSISTANCE METHOD

TECHNICAL FIELD

The present invention relates to a driving assistance device and a driving assistance method for a vehicle.

BACKGROUND ART

In recent years, development of a driving assistance device and a driving assistance method for a vehicle using a map has been actively promoted, and PTL 1 is known as an example of such an attempt.

In PTL 1, for the purpose of preventing unnecessary determination that autonomous traveling control is not allowed in front of a point where estimation accuracy is required when allowability of autonomous traveling control is determined according to estimation accuracy of self-position estimation required at the point ahead on a scheduled travel route, "there is provided a driving assistance method of setting a scheduled travel route of own vehicle, estimating a self-position that is a current position of the own vehicle, and controlling a driving behavior of own vehicle to assist traveling along the traveling plan route based on the scheduled travel route and the self-position. In this driving assistance method, by estimating an estimation error of the self-position, and setting an allowable error of the self position corresponding to the driving behavior of the own vehicle scheduled at a point ahead of the self-position, on a scheduled travel route and ahead of the self-position, the allowable error of the self position being larger as the point is farther from the self position if the driving behavior of the own vehicle is the same, allowability of control of driving behavior of own vehicle is determined according to whether or not the estimation error of the self-position is within the allowable error".

CITATION LIST

Patent Literature

PTL 1: JP 2021-006431 A

SUMMARY OF INVENTION

Technical Problem

According to PTL 1, when allowability of autonomous traveling control is determined according to the allowable error of the self-position required at the point ahead of the self-position on the scheduled travel route, it is possible to suppress unnecessary determination that autonomous traveling control is not allowed in front of the point.

However, according to PTL 1, in a case in which accuracy of a map is low, driving assistance and automatic driving may not be continued at an inappropriate timing. As a typical example, a case is assumed in which, regarding a position of a target feature in a right forward direction, particularly when a vehicle turns right during the left-side driving based on a scheduled travel route determined in advance and on the self-position, it is found that, at the time of right turning, the position of the target feature actually measured is closer to the own position than an expected position is on the scheduled travel route.

In such a state, there is a possibility that continuation of automatic driving becomes impossible as the vehicle needs to move backward, but backward movement in an intersection may cause a safety problem. Although there is a case where driving can be continued by emergent correction of the scheduled travel route, passengers may feel uncomfortable because ride quality decreases.

From the above, an object of the present invention is to provide a driving assistance device and a driving assistance method that are capable of determining, at an appropriate timing, suspension of driving assistance and automatic driving due to a feature error of a map.

Solution to Problem

From the above, the present invention provides "a driving assistance device including: a determination point setting unit that sets a determination point in which an assumed self-position of own vehicle that is assumed on a map, a position of a measurement target feature on the map, and an error predicted as a difference between the position on the map and an actual position of the measurement target feature are associated with each other, the measurement target feature being measurable from the assumed self-position; a target feature measurement unit that obtains a measurement position of the measurement target feature based on external information acquired by an external sensor mounted on the own vehicle; a self-position estimation unit that estimates a self-position of the own vehicle on the map based on the external information; and a driving assistance state setting unit that sets a control mode of a driving assistance system of the own vehicle based on the determination point, the measurement position of the measurement target feature measured by the target feature measurement unit, and the self-position of the own vehicle estimated by the self-position estimation unit".

The present invention further provides "a driving assistance method, by a computing machine, for generating a travel track of a vehicle on a map and assisting driving of the vehicle along the travel track, the driving assistance method including: setting, as a determination point, a limit position on the travel track that allows a stable operation at a time of turning right or left according to a given vehicle motion allowable amount on the travel track generated using a feature position on a map, in consideration of a feature error; and determining allowability of driving assistance in accordance with a measured feature position when a measured vehicle position reaches the determination point during actual traveling of the vehicle".

Advantageous Effects of Invention

It is possible to provide a driving assistance device and a driving assistance method that are capable of determining, at an appropriate timing, suspension of driving assistance and automatic driving due to a feature error of a map.

DESCRIPTION OF EMBODIMENTS

Hereinafter, embodiments of the present invention will be described with reference to the drawings.

Embodiment 1

Figure 1:
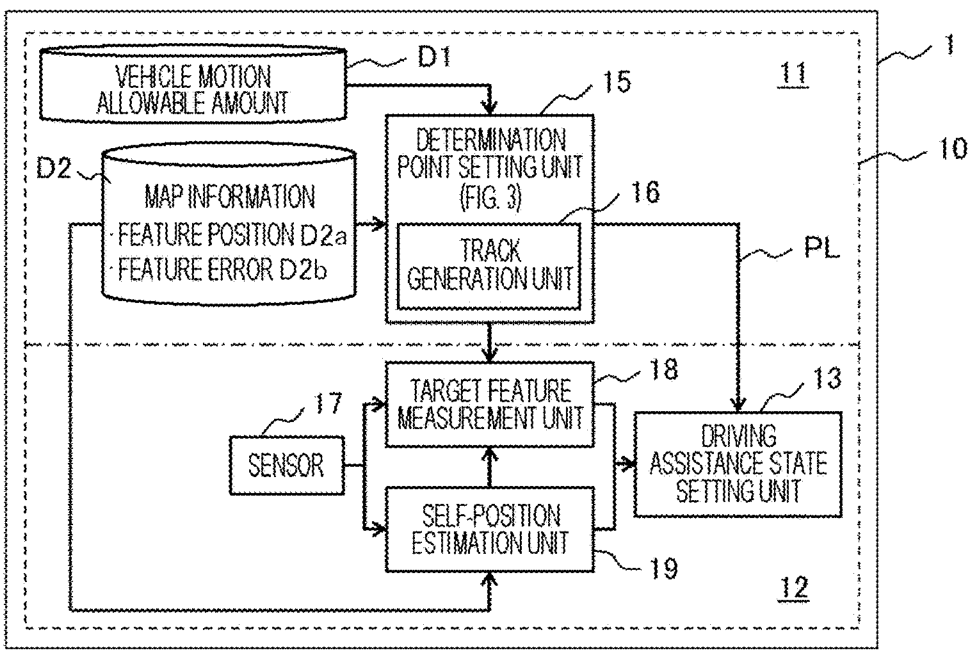
FIG. 1 is a diagram illustrating a configuration example of a driving assistance device according to an embodiment 1 of the present invention.

FIG. 1 is a diagram illustrating a configuration example of a driving assistance device according to an embodiment 1 of the present invention. Functions of a driving assistance device 10 mounted on a vehicle 1 roughly include a track creation processing unit 11 that determines a scheduled travel route (hereinafter referred to as a travel track) in advance, and a track travel confirmation processing unit 12 that confirms, during actual traveling, that a vehicle operation along the travel track is continuable. The driving assistance device 10 is configured using a computing machine.

Among these, the track creation processing unit 11 stores a vehicle motion allowable amount D1 and map information D2 in a storage unit such as a ROM in advance, and a track generation unit 16 creates a travel track on the map in advance using these pieces of information. In the present invention, a determination point setting unit 15 sets a determination point to be described later in detail on the travel track.

Figure 2:
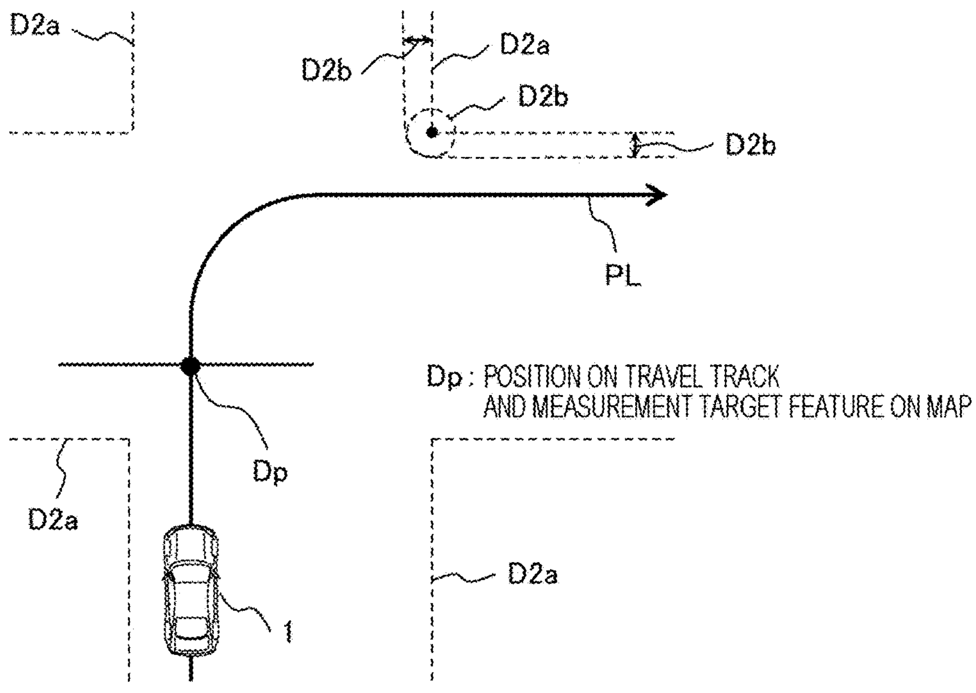
FIG. 2 is a view illustrating a relationship between a travel track and a determination point.

FIG. 2 is a view illustrating a relationship between the travel track and the determination point. According to a travel track PL created by the track generation unit 16 in the example of the figure, a vehicle traveling on the left side is scheduled to turn right at an intersection as in Japan.

The method of creating the travel track PL in the track generation unit 16 is already a well-known method, and the description of this method is omitted, but to put it simply, as illustrated in FIG. 2, the travel track PL is created by using a feature position D2*a* included in the map information D2 so that the vehicle does not contact the feature position D2*a*. The feature position D2*a* in this example is a position of a white line or a curbstone on a road left side or at a corner of the intersection, and a white line of a lane or the like is also included.

As the map, for example, an SD map widely facilitated in general roads is used. The SD map has a feature error D2*b* larger than that of the high precision map, and when the track generation unit 16 generates the travel track PL, the travel track PL is set in consideration of the feature error D2*b* for the feature position D2*a* in the map information. In addition, a map generated from a measurement result of a sensor mounted on the vehicle 1 (self-generated map) may be used as the map.

In the present invention, the determination point setting unit 15 sets a determination point Dp illustrated in FIG. 2 for the travel track PL on the map created as described above. The determination point Dp in this example defines a limit point, on the travel track PL, that allows traveling according to a turning radius, for example, set in advance as the vehicle motion allowable amount D1.

Before the determination point Dp, it is possible to travel by turning moderately even if the feature error D2*b* exists, but it is necessary to make a sudden turn if the feature error D2*b* is found after the determination point Dp. In some cases, in addition to a sudden turn, there is a risk of a contact with a feature in front on the right side (particularly referred to as a measurement target feature). A limit point leading to such an event is the determination point Dp. The determination point Dp is defined as information including a position on the travel track PL and a position of the measurement target feature.

As described above, the track creation processing unit 11 sets the determination point Dp including the position on the map and the position of the measurement target feature from the vehicle motion allowable amount D1 as well as the feature position D2*a* and the error D2*b* on the map. It can be said that the determination point Dp defines a limit point at which traveling on the travel track PL is continued in order to give passengers a sense of security or to protect safety.

In the above description, a concept of the processing of the determination point setting unit 15 and the track generation unit 16 has been described. The processing is virtually treated on the map, and the determination point setting unit 15 can be said to "set a determination point in which an assumed self-position of own vehicle that is assumed on a map, a position of a measurement target feature on the map, and an error predicted as a difference between the position on the map and an actual position of the measurement target feature are associated with each other, the measurement target feature being measurable from the assumed self-position".

Further, to describe the processing of the determination point setting unit 15 in detail, "when the track generation unit is unable to generate the travel track that satisfies a vehicle motion allowable amount of the own vehicle, the determination point setting unit sets a determination point by associating the assumed self-position with the position and the error of the measurement target feature on the map, the assumed self-position being a start point of the travel track, the measurement target feature being measurable from the assumed self-position".

Further, the track generation unit 16 "generates a travel track of the own vehicle starting from the assumed self-position based on the assumed self-position on the map and on a position and an error of the measurement target feature on the map".

On the other hand, the track travel confirmation processing unit 12 of FIG. 1 uses an output of an external sensor (external information) among various sensors 17 provided in the vehicle 1, and a target feature measurement unit 18 recognizes, as the measurement target feature, a feature to be monitored at the time of turning right on the left travel, for example, among a plurality of features associated with the vehicle travel, and thus a distance, a position, and the like are determined. Furthermore, a self-position estimation unit 19 estimates the traveling position (self-position estimation result) of the vehicle 1 using, for example, the external information, among the various sensors 17 provided in the vehicle 1.

In addition, a driving assistance state setting unit 13 in the track travel confirmation processing unit 12 sets a control mode of driving assistance and automatic driving based on the travel track PL created in advance by the track creation processing unit 11 and current states confirmed by the track travel confirmation processing unit 12 (an external recognition result, a self-position estimation result, and a determination point). The control mode is allowability of continuation of the automatic driving, for example, and it is determined that the continuation of the automatic driving is not possible when the own vehicle passes the position of the determination point Dp and the measurement target feature is not recognized.

In the above, a concept of the processing of the track travel confirmation processing unit 12 has been described. The track travel confirmation processing unit 12 can be said to "set a control mode of a driving assistance system of the own vehicle based on the determination point, the measurement position of the measurement target feature measured by the target feature measurement unit, and the self-position of the own vehicle estimated by the self-position estimation unit".

Figure 3:
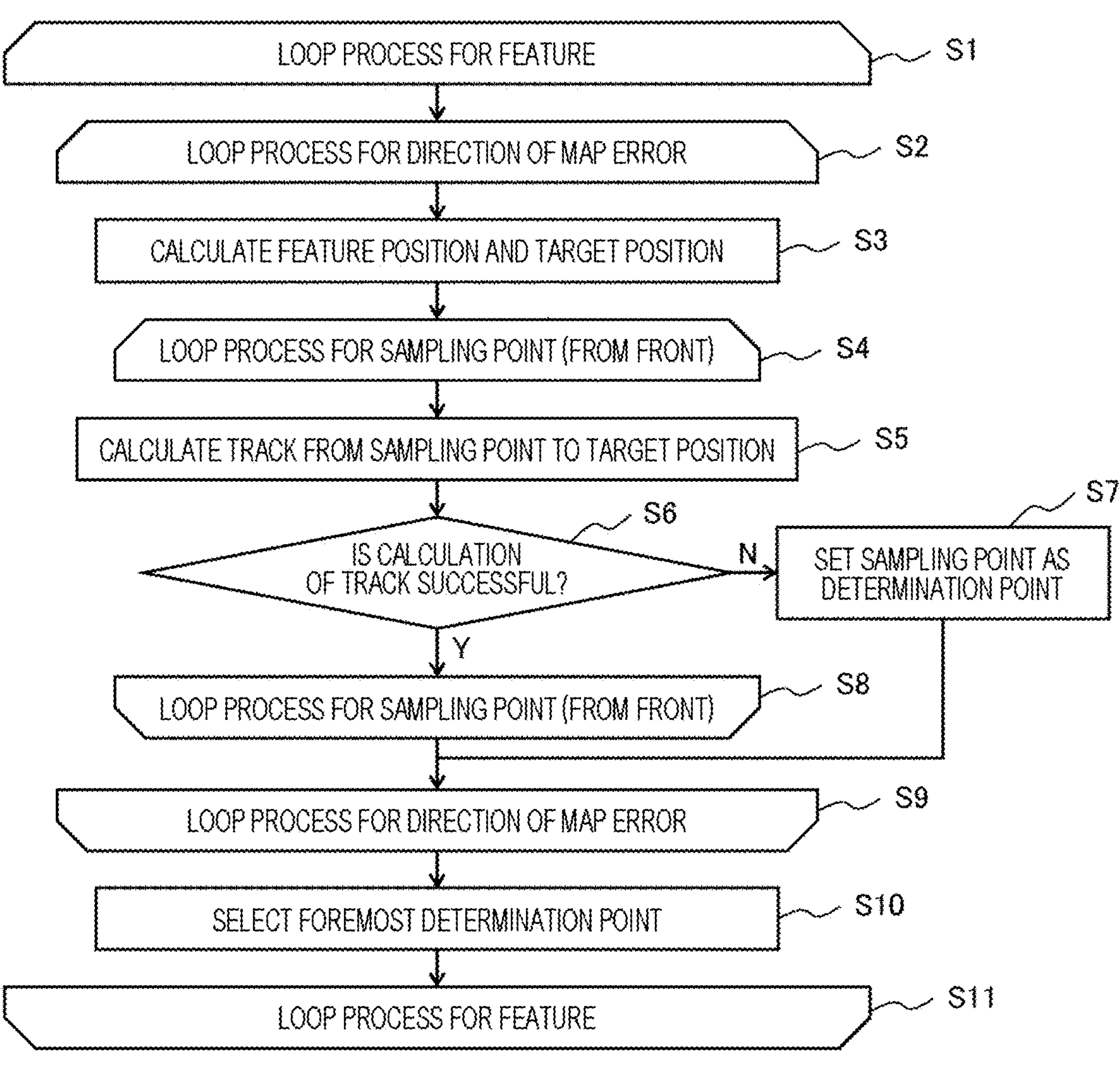
FIG. 3 is a flowchart showing processing contents of a determination point setting unit 15.

FIG. 3 is a flowchart showing processing contents of the determination point setting unit 15. In this flowchart, three sets of repetitive processing are set. One of these is a loop process of repeatedly executing processing on a feature, in particular, processing steps S1 to S11 that are sequentially called and performed on a feature located on the left side of the travel track.

This loop is a large loop, including a middle loop which is a loop process of repeatedly executing processing on a direction of a map error, and the direction of the map error is sequentially called and the processing steps S2 to S9 are sequentially executed.

The middle loop further includes a small loop which is a loop process of repeatedly executing processing on sampling points, and the sampling points are sequentially called to sequentially execute the processing steps S4 to S8.

Figure 4:
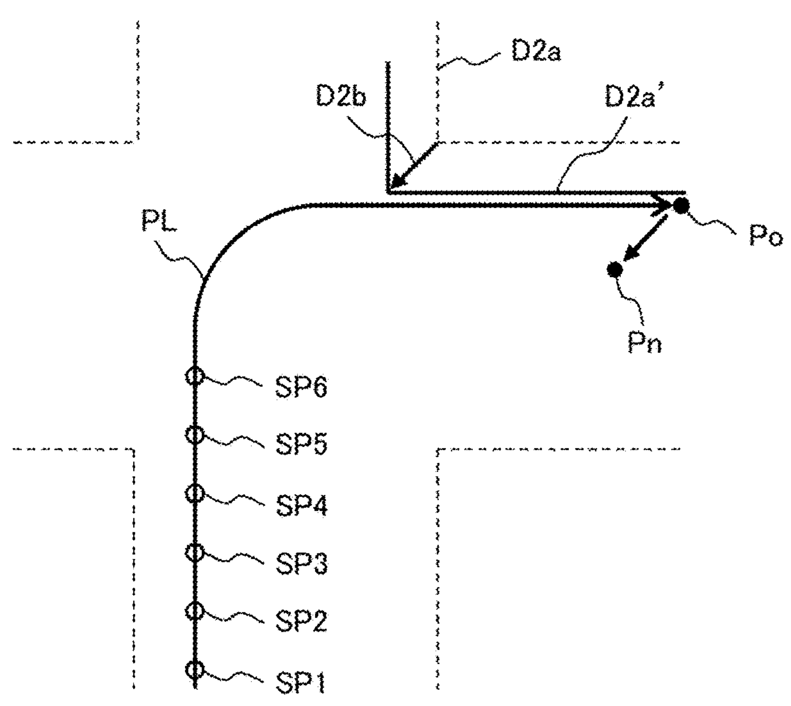
FIG. 4 is a view illustrating processing contents of FIG. 3.

Thus, in the flowchart of FIG. 3, it is assumed that a plurality of the features D2*a* on the travel track are sequentially called in the processing step S1, and the processing is to be performed to the feature at upper right of FIG. 4, for example. An example of the upper right is a scene of turning right at an intersection, which is a determination scene to be most carefully treated in the automatic driving. Hereinafter, this feature is referred to as a measurement target feature. Next, in the processing step S2, the processing is performed to the map error D2*b* included in the map position of the measurement target feature D2*a* that has been selected. Here, for each feature, the processing is sequentially performed with reference to a map error in the area.

In the processing step S3, the feature position and the target position are calculated based on the directions of the feature and the map error under extracted conditions. For example, FIG. 4 is a diagram illustrating the processing contents of FIG. 3. In a case where D2*a* indicated by a dotted line is the position of the measurement target feature on the map D2, and a magnitude and a direction of the map error D2*b* in the vicinity are as illustrated, the feature position is changed to D2*a*' indicated by a solid line, and in this case, there is a concern of an interference with a corrected feature position D2*a*' in the travel track PL originally scheduled by the track generation unit 16. Therefore, in the processing step S3, a target position Po after the right turn on the travel track PL initially scheduled by the track generation unit 16 is determined as a corrected target position Pn in consideration of the magnitude and the direction of the map error D2*b*.

In the processing step S4, the processing is performed to a sampling point SP set on the travel track PL of FIG. 4. A plurality of sampling points SP are set at intervals, and the determination processing is sequentially performed from the front in the drawing. In this example, the processing to a sampling point SP1 is first performed, and a track from the sampling point SP1 to the target position Po is calculated in the processing step S5. Here, when the target position Po is changed to the corrected target position Pn as a result of consideration of the magnitude and the direction of the map error D2*b*, a track from the sampling point SP1 to the corrected target position Pn is calculated.

In the processing step S6, it is determined that the track of the vehicle up to the target position Po (or the modified target position Pn) can be calculated based on the turning radius set as the vehicle motion allowable amount D1, and when the track can be calculated, the process returns from the processing step S8 to the processing step S4, and similar processing and determination are repeated for a subsequent sampling point SP2.

As a result, it is assumed that track calculation is successful up to a sampling point SP5, but the track calculation cannot be performed at a sampling point SP6. In this case, in the processing step S7, the sampling point SP6 at which the track cannot be calculated is recognized as the determination point Dp, and the determination point Dp at this time is recorded as information including the position on the travel track PL and the position of the measurement target feature D2*a*. Note that the sampling point SP5 before the sampling point SP6 at which the track cannot be calculated may be identified as the determination point Dp.

The above-described repetitive processing in FIG. 3 is sequentially performed until the determination is repeatedly made for the plurality of features D2*a* on the travel track PL and the processing for all the target features is completed. In the processing step S10, the determination point closest to the vehicle on the travel track PL is selected.

According to the above processing, it is determined that the vehicle can calculate the track to the target position Po (or the modified target position Pn) at the final sampling point SP5 before the determination point Dp (sampling point SP6), and the track cannot be calculated at the determination point Dp. Regarding the treating of the travel track PL at this time, the following two ways are conceivable, but the present invention may adopt either of these.

One method keeps the information on the determination point Dp assigned to the travel track PL, and the other method assigns the information on the determination point Dp as a new travel track PL created at the corrected target position Pn.

Returning to FIG. 1, the travel track PL provided by the track creation processing unit 11 includes the information of the determination point Dp in consideration of the map error D2*b*. In addition, the track travel confirmation processing unit 12 determines a state in which the automatic driving is performed on the travel track PL including the information of the determination point Dp in consideration of the map error D2*b* from the external recognition result and the self-position estimation result detected by the sensors 17, confirms, before the vehicle reaches the determination point Dp, that the driving operation can be performed safely without causing anxiety to the passengers, and sets the control mode of driving assistance and automatic driving.

The control mode is allowability of continuation of the automatic driving, for example, and it is determined that the continuation of the automatic driving is not possible when the own vehicle passes the position of the determination point Dp and the measurement target feature is not recognized.

Figure 5:
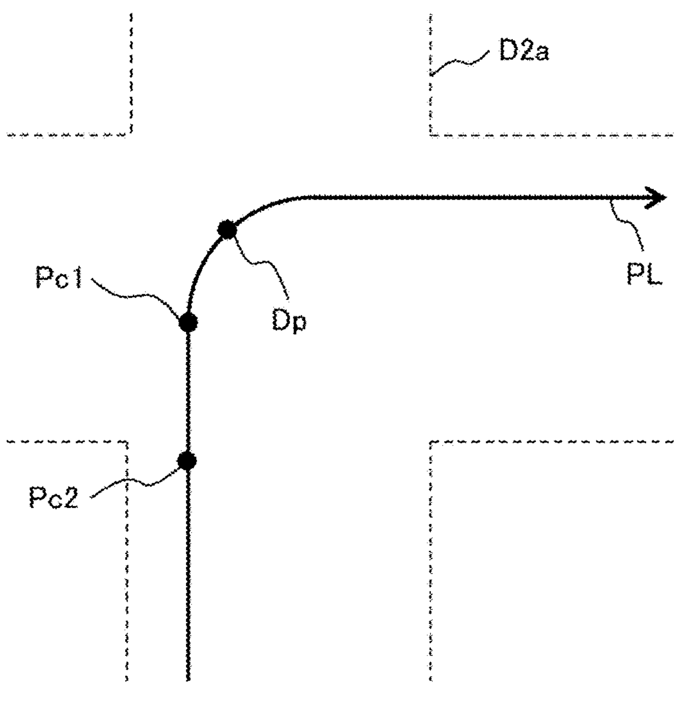
FIG. 5 is a view for describing a response for performing quick handover from automatic driving to driving by a driver when it is determined that continuation of automatic driving is not possible.

FIG. 5 is a view for describing a response for performing quick handover from the automatic driving to driving by a driver when it is determined that continuation of the automatic driving is not possible. In such a situation, a plurality of settings can be made on the safety side.

In FIG. 5, Dp is a determination point based on track generation, and after this point, a stable and safe operation along the travel track PL may be hindered. Therefore, when the determination point Dp comes closer, it is necessary to notify the driver of the approach in advance so the driver is prepared for manual driving.

As a countermeasure, the determination point setting unit 15 sets, in addition to the determination point Dp as the limit point, a determination point for notification or preparation on the travel track PL at a position before the determination point Dp as the limit point.

Among these, assuming that a determination point at which the preparation for manual driving by the driver is completed and thus handover from the automatic driving to driving by the driver is performed is set as a handover point Pc for handover from the automatic driving to driving by the driver, it is conceivable that the determination point is set to Pc1 or Pc2 before the determination point Dp. Since a handover point Pc1 is a position at which a steering angle of a steering wheel becomes 0 degrees and at which the vehicle may have already entered the intersection, a position before the road structure before an entrance of the intersection changes is set as a handover point Pc2.

In setting of the handover point Pc by the determination point setting unit 15, it is preferable that the position of the handover point Pc is set to a position before the determination point Dp based on at least one of the steering angle of the own vehicle at the assumed self-position, the switching of the road region on the map, and reaction time of the driver.

In addition, regarding the determination point (hereinafter, notification point) for guide and notification for the driver, since the handover point Pc assumes a position when the driver becomes prepared for driving, it is preferable to set the timing of the notification point for guiding the driver to switch the driving from the driving assistance device to the driver at T seconds before the determination point (handover point Pc) and to switch the driving to the driver's driving at the handover point Pc, or to notify the driver of possibility of switching of driving before T and extra seconds.

According to the correspondence in FIG. 5, there is an effect that the handover of the driving to the driver can be smoothly performed by correcting the determination point Dp based on the track generation to include a preliminary point so as to make the determination point Dp be optimal for the driver.

Figure 6:
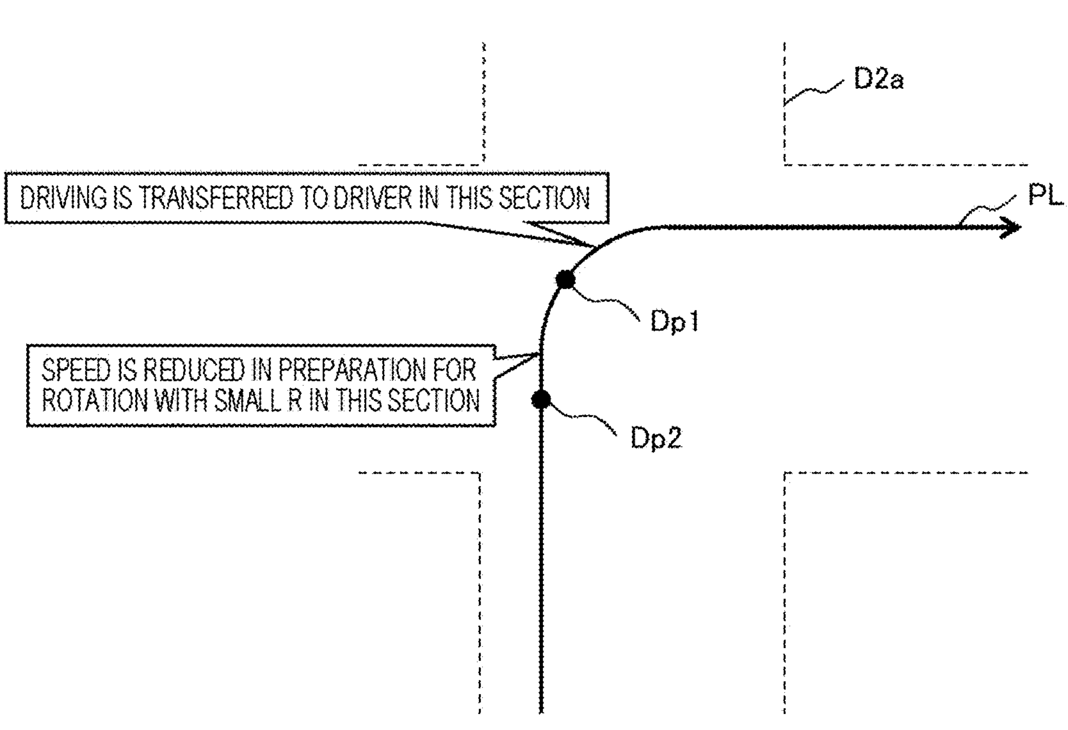
FIG. 6 is a view for describing setting of a plurality of determination points.

FIG. 6 is a view for describing setting of a plurality of types of determination points Dp. In the description up to FIG. 5, one determination point Dp has been considered, but in FIG. 6, determination points Dp1 and Dp2 of a plurality of levels are calculated. In this drawing, the determination point Dp2 on the front side is determined from a viewpoint of the sense of security given to the passengers as there is a possibility of wobbling beyond this point, and the determination point Dp1 during the turning is determined from a viewpoint that there is a possibility that backward movement is required beyond this point, and thus there is a possibility that the turning cannot be completed with a minimum turning radius.

In this case, it is preferable that the control mode in a section between the determination points Dp1 and Dp2 is a control mode in which driving is performed so as to reduce the speed in preparation for turning with a small turning radius R, and the control mode in a section after the determination point Dp1 is a control mode in which handover of the driving to the driver is performed.

Therefore, it is preferable that the information on the determination point Dp is defined as information including, in addition to the position on the travel track PL and the position of the measurement target feature, the control mode in the section between the determination points Dp1 and Dp2.

When the determination points Dp1 and Dp2 of the plurality of levels are calculated, a plurality of combinations of the vehicle motion allowable amount and the speed upper limit may be prepared. For example, it is possible to calculate the determination points of a plurality of levels by changing at least one of the determination condition for successful track calculation and the vehicle motion allowable amount D1 so that the determination point Dp when the vehicle enters the intersection at a relatively high speed and the determination point Dp when the vehicle enters the intersection at a relatively low speed take different positions, and thus it is possible to set the control mode according to the level of the determination point. As a result, an effect that the control mode can be appropriately set is provided.

Here, there is a case where the determination point setting unit 15 allows only forward movement and does not allow backward movement as the vehicle motion allowable amount D1, and in this case, it is preferable to set the determination point Dp at which driving assistance is uncontinuable and handover to driving by the driver is performed with the possibility of the backward movement.

In addition, when the turning radius of the own vehicle is used as the vehicle motion allowable amount D1, it is possible to treat as a variable value in which the upper speed limit of the driving assistance system is set to be smaller as the turning radius is smaller.

Embodiment 2

In the embodiment 1, the travel track PL is created for the feature. On the other hand, in an embodiment 2, the determination is made in consideration of road conditions other than the feature.

Figure 7:
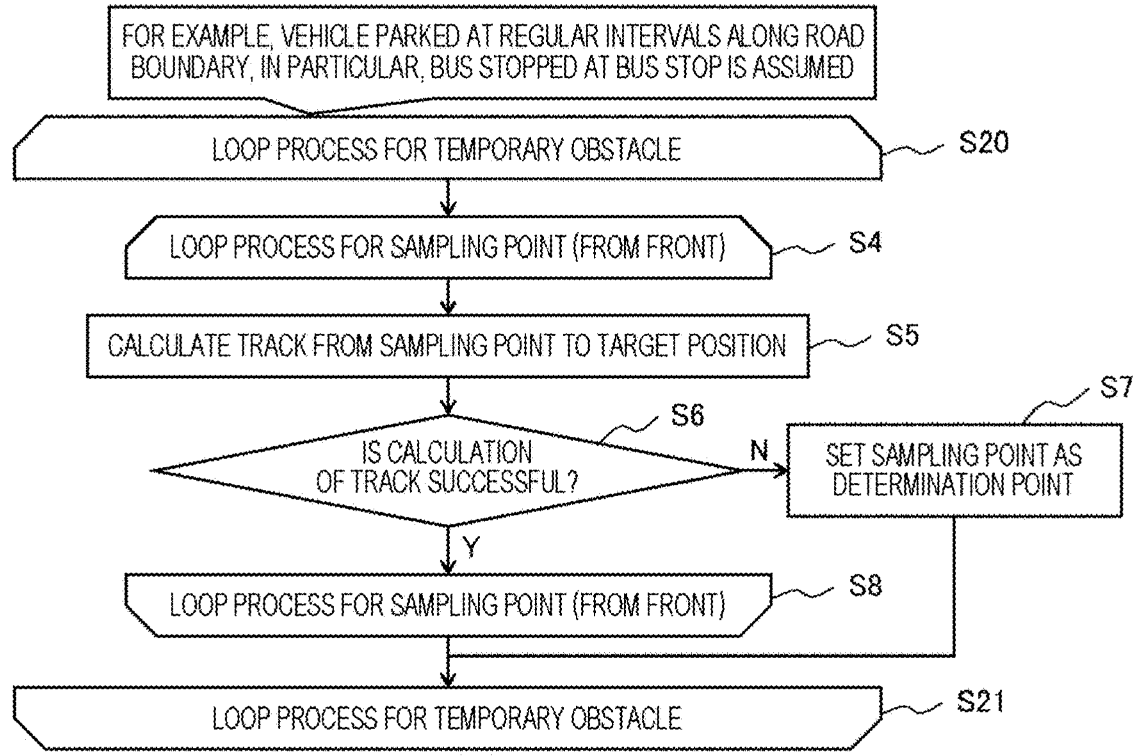
FIG. 7 is a flowchart showing processing contents of a determination point setting unit 15 in consideration of road conditions.

FIG. 7 is a flowchart showing processing contents of the determination point setting unit 15 in consideration of road conditions. In the repetitive processing of FIG. 3, the repetitive processing is performed to the directions of the feature and the map error. On the other hand, in the embodiment 2, the repetitive processing is performed to the road situation.

In this case, processing steps S20 and S21 are repeated, but internal processing thereof is the same as that in FIG. 3 of the embodiment 1, and the description thereof is omitted. In short, in the processing step S20, a temporary obstacle is set as the road condition, and the travel track PL and the determination point Dp for the temporary obstacle are set. That is, the determination point setting unit 15 sets the determination point based on an assumed obstacle position on the map instead of the position and the error of the measurement target feature on the map.

As an obstacle to be temporarily set, for example, a vehicle 1X that is parked at regular intervals along a road boundary is assumed, and it is preferable to set the travel track PL and the determination point Dp assuming a situation particularly where a bus is stopped at a bus stop.

Figure 8:
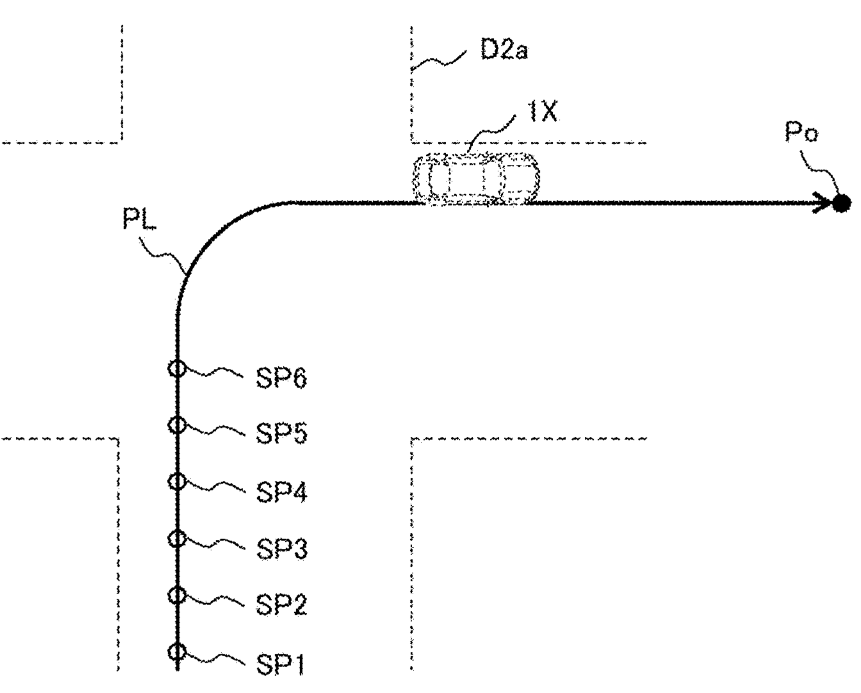
FIG. 8 is a view illustrating processing contents of FIG. 7.

FIG. 8 is a diagram illustrating the processing content of FIG. 7, and setting of the travel track PL and the determination point Dp when there is the provisional vehicle 1X is at each sampling point SP is performed. When the track cannot be calculated, the determination point Dp is set.

At this time, the driving assistance continuation determination unit 13 determines that continuation of the automatic driving is not possible when the own vehicle passes the position of the determination point Dp and it is unclear that there is no obstacle at the temporary obstacle position. This is realized, for example, when the driving assistance state setting unit fails to recognize that there is no assumed obstacle corresponding to the assumed self position after the self-position matches the assumed self-position, the driving assistance state setting unit determines that automatic driving of the own vehicle by the driving assistance system is uncontinuable.

Embodiment 3

In the embodiment 1, the feature error D2*b* is treated as the information included in the map (the SD map or the self-generated map), but this may be further treated as an error based on actual measurement.

Figure 9:
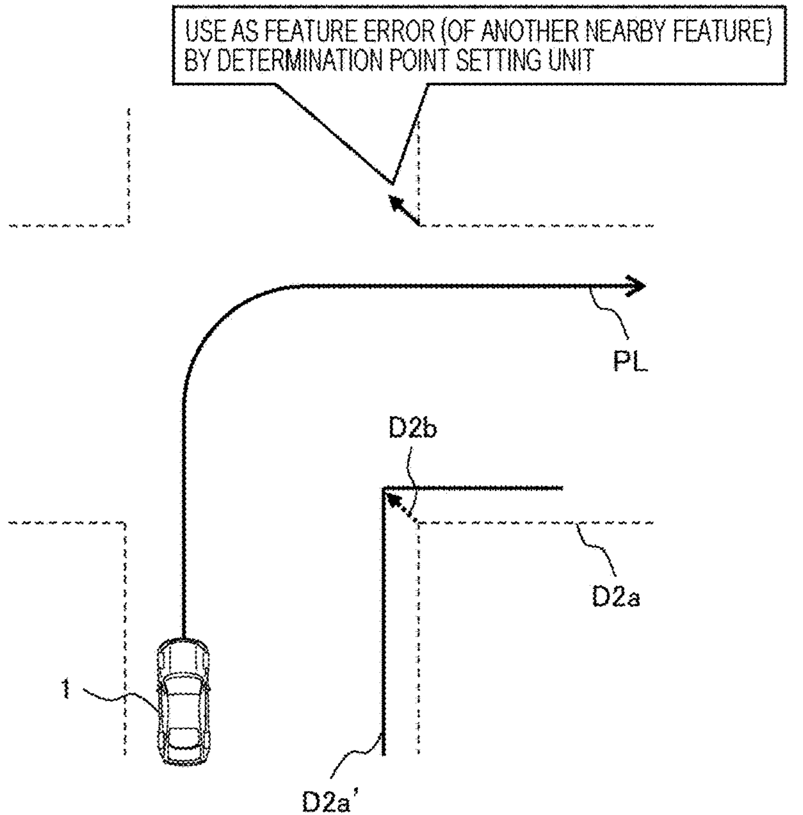
FIG. 9 is a view illustrating that an error based on actual measurement is treated as a feature error.

FIG. 9 is a view illustrating that an error based on actual measurement is treated as a feature error. In this figure, for example, it is assumed that the feature position D2*a* estimated by the track creation processing unit 11 in FIG. 1 based on the position information of the map is different from the feature position D2*a*' measured by the target feature measurement unit 18 at a point where the vehicle has already passed. In addition, it is further assumed that a magnitude and a direction of the feature error at this time are known as measurement results.

Then, in an embodiment 3 of the present invention, a map error as the past measurement result is treated as a map error at a future point. Specifically, the map error is used to set the travel track PL and the determination point Dp at the intersection where the turning to the right is scheduled from now. In this case, which one or both of the map error obtained from the map and the map error obtained from the measurement result should be used can be appropriately determined and applied.

In this process, the determination point setting unit 15 sets the magnitude of the error of another measurement target feature existing around the own vehicle by using the measurement position of the measurement target feature measured by the target feature measurement unit 18 and comparing the measurement position with the position of the measurement target feature on the map.

Embodiment 4

In the above embodiments, in configuring the driving assistance device 10 using the computing machine, the calculation load is not considered. Therefore, in an embodiment 4, a method for reducing the calculation load will be described.

Figure 10:
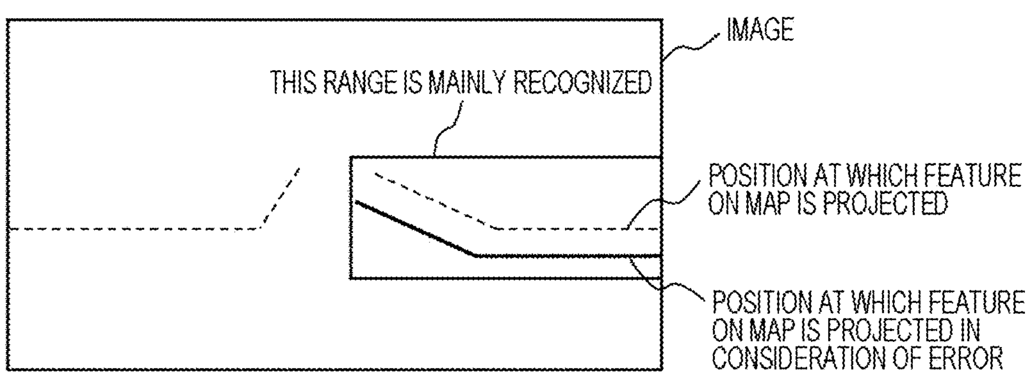
FIG. 10 is a view for describing a processing method for reducing a calculation load.
Figure 10:
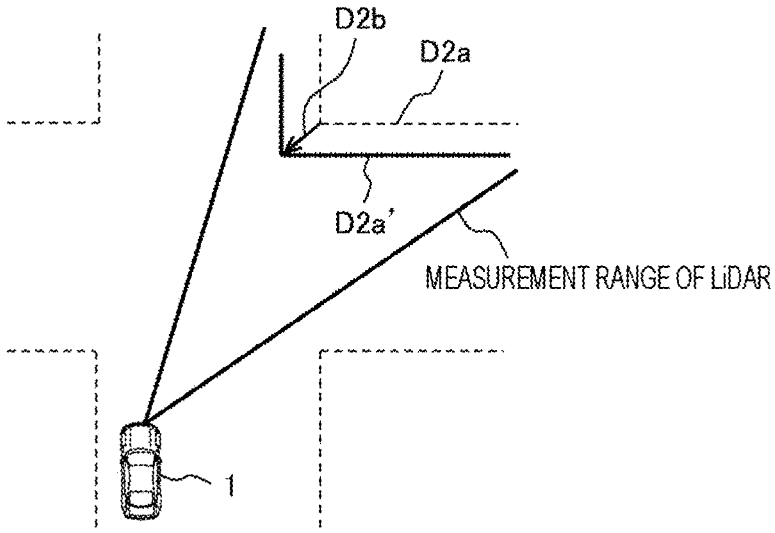

FIG. 10 is a view for describing the processing method for reducing the calculation load, and a lower part of the figure illustrates a state in which the own vehicle is approaching an intersection scheduled to turn right and the determination point Dp comes closer. In this state, the driving assistance device 10 intensively monitors a right front area that turns right, and does not monitor other areas (for example, left side and left front side) to achieve this. For example, in a case where an LiDAR is used as a sensor, a measurement range of the LiDAR for the information of the target feature measurement unit 18 obtained from an output of the sensor 3 is specialized for the measurement target feature D2*a* on the right front. As a result, the load required for the processing on the target feature measurement unit 18 can be reduced.

An upper part of FIG. 10 schematically illustrates an image grasped by the sensor in a case where a camera is used as the sensor, and shows that image processing of the right front region surrounded by a square is mainly performed.

As described above, the calculation load can be reduced by performing recognition processing focusing on the measurement target feature when the position of the determination point Dp comes closer. Alternatively, there is an effect that, by taking time for the recognition processing of the measurement target feature, the recognition of the measurement target feature is facilitated, and suspension of driving assistance and automatic driving is reduced.

In this case, preferably, the target feature measurement unit 18 performs external recognition process based on the position of the measurement target feature by using the determination point when the target feature measurement unit 18 approaches the position of the determination point.

Embodiment 5

In an embodiment 5, a countermeasure is taken against a problem of occlusion in which a rear object that is to be originally measured is hidden by a front object.

Figure 12:
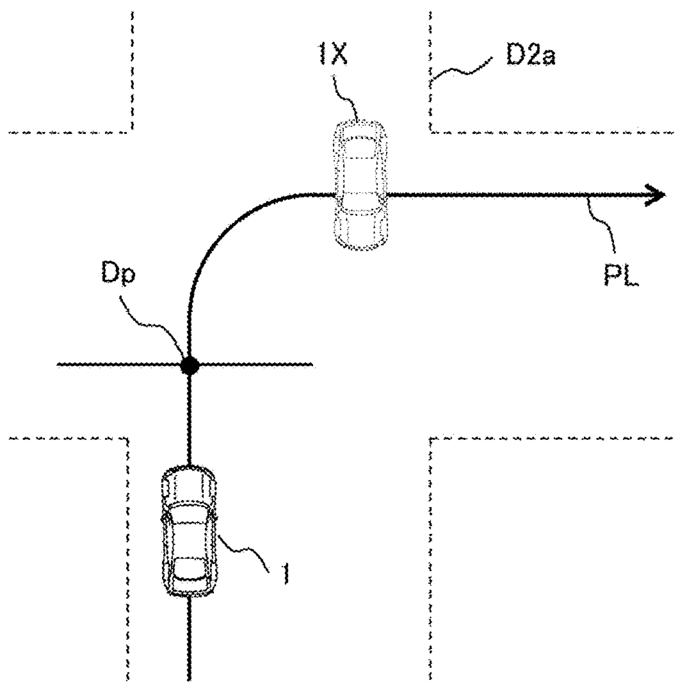
FIG. 12 is a view showing a state of occlusion.

FIG. 12 is a view showing a state of occlusion, illustrating a state in which, although the own vehicle 1 is at a stage at which approaches the intersection to make confirmation at the determination point Dp, the other vehicle 1X is at a position that hides the measurement target feature D2*a*, and the measurement target feature D2*a* is not measured.

Figure 11:
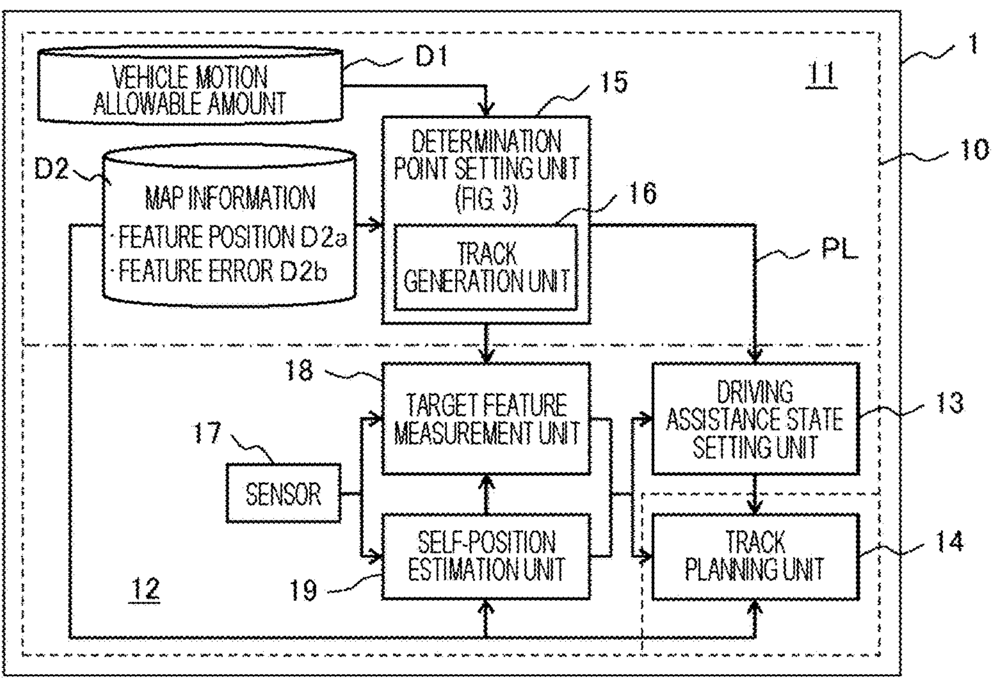
FIG. 11 is a diagram illustrating a configuration example of a driving assistance device according to an embodiment 5 of the present invention.

FIG. 11 is a diagram illustrating a configuration example of a driving assistance device according to the embodiment 5, and at this time, the driving assistance device 10 causes a track planning unit 14 to perform processing. First, the driving assistance state setting unit 13 determines that a cause of failure in measurement of the measurement target feature D2*a* at the determination point Dp is occlusion due to a moving object (another vehicle 1X), and transmits the determination result to the track planning unit 14. The track planning unit 14 drives by planning the speed of the own vehicle from a distance to the position of the determination point Dp and a speed of the moving object (another vehicle 1X) such that occlusion is resolved before the own vehicle reaches the determination point Dp.

As described above, the driving assistance state setting unit recognizes occlusion by a moving object as a reason that recognition of the measurement target feature fails, and the track planning unit 14 plans the speed of the own vehicle based on the distance to the position of the determination point Dp and the speed of the moving object, the speed being planned such that the occlusion by the moving object is resolved before the own vehicle reaches the position of the determination point Dp.

As a result, the occlusion is eliminated at the determination point Dp, and the measurement target feature D2*a* becomes measurable. According to the embodiment 5, there is an effect that the suspension of driving assistance and automatic driving is reduced.

REFERENCE SIGNS LIST

1 vehicle
10 driving assistance device
11 track creation processing unit
12 track travel confirmation processing unit
13 driving assistance continuation determination unit
14 track planning unit
15 determination point setting unit
16 track generation unit
17 sensor
18 target feature measurement unit
19 self-position estimation unit

The invention claimed is:

1. A driving assistance device comprising:

a determination point setting unit that sets a determination point in which an assumed self-position of own vehicle that is assumed on a map, a position of a measurement target feature on the map, and an error predicted as a difference between the position on the map and an actual position of the measurement target feature are associated with each other, the measurement target feature being measurable from the assumed self-position;

a target feature measurement unit that obtains a measurement position of the measurement target feature based on external information acquired by an external sensor mounted on the own vehicle;

a self-position estimation unit that estimates a self-position of the own vehicle on the map based on the external information;

a track planning unit that plans a travel track of the own vehicle used by the driving assistance system; and a driving assistance state setting unit that sets a control mode of a driving assistance system of the own vehicle based on the determination point, the measurement position of the measurement target feature measured by the target feature measurement unit, and the self-position of the own vehicle estimated by the self-position estimation unit, wherein a track planning unit that plans a travel track of the own vehicle used by the driving assistance system, the driving assistance state setting unit recognizes occlusion by a moving object as a reason that recognition of the measurement target feature fails, and the track planning unit plans a speed of the own vehicle based on a distance to the position of the determination point and a speed of the moving object, the speed being planned such that the occlusion by the moving object is resolved before the own vehicle reaches the position of the determination point.

2. The driving assistance device according to claim 1, wherein the determination point setting unit corrects the position of the determination point to a near side based on at least one of a steering angle of the own vehicle at the assumed self-position, switching of a road region on the map, and reaction time of a driver.

3. The driving assistance device according to claim 1, wherein when the driving assistance state setting unit fails to recognize the measurement target feature corresponding to the assumed self-position after the self-position matches the assumed self-position, the driving assistance state setting unit determines that automatic driving of the own vehicle by the driving assistance system is uncontinuable.

4. The driving assistance device according to claim 1, wherein the driving assistance device performs external recognition process based on the position of the measurement target feature by using the determination point when the driving assistance device approaches the position of the determination point.

5. The driving assistance device according to claim 1, further comprising:

a track generation unit that generates a travel track of the own vehicle starting from the assumed self-position based on the assumed self-position on the map and on a position and an error of the measurement target feature on the map, wherein when the track generation unit is unable to generate the travel track that satisfies a vehicle motion allowable amount of the own vehicle, the determination point setting unit sets a determination point by associating the assumed self-position with the position and the error of the measurement target feature on the map, the assumed self-position being a start point of the travel track, the measurement target feature being measurable from the assumed self-position.

6. The driving assistance device according to claim 5, wherein the determination point setting unit adds a new determination point to a position of the determination point before a preset time, the new determination point being a handover notice to a driver of the own vehicle, and the determination point includes information on a control mode of driving.

7. The driving assistance device according to claim 5, wherein in a case where, as the vehicle motion allowable amount, only a forward motion is allowable and a backward motion is unallowable, the determination point setting unit sets the control mode to a mode in which driving assistance is uncontinuable and handover to driving by the driver is performed.

8. The driving assistance device according to claim 5, wherein the determination point setting unit uses a turning radius of the own vehicle as the vehicle motion allowable amount, and sets an upper speed limit of the driving assistance system to be smaller as the turning radius is smaller.

9. The driving assistance device according to claim 5, wherein the determination point setting unit sets the determination point taking the measurement target feature on the map and existing on a left side of the self-position as a target.

10. The driving assistance device according to claim 5, wherein the determination point setting unit sets the determination point based on an assumed obstacle position on the map in place of the position and the error of the measurement target feature on the map, and when the driving assistance state setting unit fails to recognize non-existence of an assumed obstacle corresponding to the assumed self position after the self-position matches the assumed self-position, the driving assistance state setting unit determines that automatic driving of the own vehicle by the driving assistance system is uncontinuable.

11. The driving assistance device according to claim 5, wherein the determination point setting unit sets a magnitude of an error of another measurement target feature existing around the own vehicle by using the measurement position of the measurement target feature measured by the target feature measurement unit and comparing the measurement position with the position of the measurement target feature on the map.

12. A driving assistance method, by a computing machine, for generating a travel track of a vehicle on a map and assisting driving of the vehicle along the travel track, the driving assistance method comprising:

setting, as a determination point, a limit position on the travel track that allows a stable operation at a time of turning right or left according to a given vehicle motion allowable amount on the travel track generated using a feature position on a map, in consideration of a feature error;

determining allowability of driving assistance in accordance with a measured feature position of a measurement target feature when a measured vehicle position reaches the determination point during actual traveling of the vehicle;

planning the travel track of the vehicle;

recognizing occlusion by a moving object as a reason that recognition of the measurement target feature fails; and planning a speed of the vehicle based on a distance to the determination point and a speed of the moving object, the speed being planned such that the occlusion by the moving object is resolved before the vehicle reaches the determination point.

13. The driving assistance method according to claim 12, further comprising:

obtaining a difference from the measured feature position and the feature position on the map and reflecting the difference on the travel track as the feature error during actual traveling of the vehicle.

14. The driving assistance method according to claim 12, wherein the travel track is generated using an obstacle assumed on the map.

* * * * *